Patented Jan. 14, 1941

2,228,925

UNITED STATES PATENT OFFICE 2,228,925

RECOVERY OF FATTY ACIDS AND ALKALI SALTS FROM SOAPS

Martin Luther, Mannheim, Germany, assignor, by mesne assignments, to Jasco, Incorporated, a corporation of Louisiana No Drawing. Application November 17, 1938, Serial No. 241,025. In Germany November 27, 1937

6 Claims. (Cl. 23—102)

The present invention relates to a process of recovering fatty acids from their alkali salts while simultaneously separating solid alkali salts of mineral acids by acidifying the said salts with mineral acids.

In the usual working up of crude fatty acid soaps, such as are obtainable in particular from oxidation products of high molecular weight non-aromatic hydrocarbons, the alkali soaps, for the purpose of recovering the free fatty acids, are treated in aqueous solution with mineral acids, as for example sulphuric acid or nitric acid, and the deposited free acids are separated from the salt solution formed. In many cases the alkali contained in the soaps is lost in the form of water soluble alkali salts, because a concentration or other working up of the dilute aqueous salt solutions is frequently not worth while.

I have now found that the alkali contained in the soaps can be recovered in the form of solid alkali salts in an industrially advantageous manner by treating mixtures of alkali soaps and concentrated aqueous solutions of alkali salts of mineral acids with concentrated mineral acids, preferably with mineral acids corresponding to the alkali salts used, and after separating the deposited fatty acids, separating the alkali salts separated from the aqueous solutions without evaporation of the same.

Crude alkali soaps of saponified oxidation products of high molecular weight non-aromatic hydrocarbons which have been freed from unsaponifiable constituents are especially suitable for the process. Soaps obtained by the saponification of waxy substances, such as spermaceti, sperm oil or Montan wax, after separation of the wax alcohols, are, however, also suitable. In particular there may be mentioned those crude soaps of paraffin oxidation products which are obtained by the separation of the unsaponifiable constituents from the saponification products directly in the anhydrous form, for example as soap powders or soap melts. The crude soaps can be obtained for example by spraying heated water-containing saponification products of oxidation products of high-molecular non-aromatic hydrocarbons into heated tube systems or vessels, whereby the unsaponified substances are withdrawn together with steam and the soaps are recovered in the form of a liquid anhydrous melt. Such sodium soaps have a content of from about 10 to 15 per cent of sodium.

As mineral salt solutions, sodium sulphate, sodium sulphite, ammonium sulphite, sodium nitrate, potassium nitrate, sodium chloride and sodium phosphate solutions are especially suitable; they are preferably used in concentrations which correspond approximately to saturated solutions at ordinary temperature. Depending on the nature of the alkali soaps and the salt solutions, solutions or suspensions are obtained. For example from saturated sodium sulphate and sodium phosphate solutions, concentrated solutions containing from 30 to 40 per cent of soap may readily be prepared while when using saturated sodium nitrate or sodium chloride solutions mainly only suspensions of the soaps are formed.

To the soap solutions or suspensions the mineral acid corresponding to the mineral salt used is added or another mineral acid is added in the most concentrated possible form, it being preferable to use it in a mineral salt solution identical with that used for dissolving the soaps. The amount of acid is so selected that it is sufficient for complete splitting of the alkali soaps; a certain excess may also be used. The mineral acids, when possible, may if desired be used in gaseous form, for example hydrogen chloride gas or sulphur dioxide. The treatment of the soaps with the mineral acids is carried out at ordinary or elevated temperature, preferably while stirring well; it is advantageous to work at from 50° to 100° C. After standing for a short time, two sharply separated layers form, an upper layer containing the free fatty acid and a lower layer consisting of concentrated mineral salt solution and separated solid mineral salt. By cooling the mineral salt solution, the amount of solid salt separated can be further increased. The fatty acids are withdrawn and, after washing with water, subjected to further working up, as for example to distillation. The mineral salt solutions are generally speaking freed from the separated salt without special cooling by filtration by suction or by centrifuging or the like and preferably used again for dissolving or suspending fresh soaps. The process may also be carried out in stages.

According to this invention the free fatty acids are obtained from the alkali soaps practically without waste because the fatty acids are not soluble in concentrated mineral salt solutions.

The following examples will further illustrate how the said invention may be carried out in practice but the invention is not restricted to these examples. The parts are by weight.

*Example 1*

2000 parts of a product (having a saponification value of 107) obtained by oxidizing paraffin wax with air at 115° C. in the presence of potassium permanganate as catalyst are saponified after adding 400 parts of water while using 412 parts of an aqueous caustic soda solution of 35 per cent strength at 100° C. After allowing the mixture to stand for a short time the main amount of the unsaponifiable constituents separates as an upper layer which is withdrawn. The mixture is then heated in a tube system up to 330° C. under a pressure of 130 atmospheres. After about ½ hour the mixture is sprayed into a second tube system heated to 350° C. by releasing the pressure while simultaneously leading in steam heated to 190° C. The unsaponifiable constituents distill off together with the steam and an anhydrous soap melt is obtained.

500 kilograms of this soap melt are dissolved at 80° C. in 1120 kilograms of sodium sulphate solution (specific gravity=1.29). To the clear solution there is added while stirring a mixture of 150 kilograms of concentrated sulphuric acid and 150 kilograms of saturated sodium sulphate solution. After allowing to stand for a short time, two sharply separated layers are formed, an upper layer consisting of fatty acids and a lower layer consisting of a concentrated aqueous sodium sulphate solution and solid sodium sulphate. After separating 415 kilograms of fatty acid, 190 kilograms of sodium sulphate having a water content of 1 per cent are obtained by filtering the sodium sulphate solution by suction.

The mother liquor obtained (1310 kilograms) may be used again for dissolving fresh soap or for diluting concentrated sulphuric acid.

*Example 2*

500 kilograms of a crude soap as employed in Example 1 are suspended in 1000 liters of a sodium nitrate solution (specific gravity=1.38) saturated at 40° C. While stirring the mixture at 70° C., a solution of 160 kilograms of concentrated nitric acid in 140 kilograms of a sodium nitrate solution saturated at 40° C. is added. After standing for some time, the free fatty acids separate as an upper layer which is withdrawn. The lower layer consisting of concentrated sodium nitrate solution is cooled to 40° C. and the sodium nitrate crystals deposited are filtered off by suction. The mother liquor (about 1500 kilograms) may be used for the suspension of fresh soap.

What I claim is:

1. The process of recovering fatty acids and alkali metal salts of mineral acids from alkali soaps, which consists in treating a mixture of a substantially anhydrous alkali soap and a concentrated aqueous solution of an alkali metal salt of a mineral acid with a concentrated mineral acid, separating the deposited fatty acids and removing the precipitated alkali metal salt from the aqueous solution without evaporating the same.

2. The process of recovering fatty acids and alkali metal salts of mineral acids from alkali soaps, which consists in treating a mixture of a substantially anhydrous alkali soap and a concentrated aqueous solution of an alkali metal salt of a mineral acid with a concentrated mineral acid, corresponding to that contained in the alkali metal salt, separating the deposited fatty acids and removing the precipitated alkali metal salts from the aqueous solution without evaporating the same.

3. The process of recovering fatty acids and alkali metal salts of mineral acids from alkali soaps, which consists in treating a mixture of substantially anhydrous alkali soaps from acids, obtained by oxidizing high-molecular non-aromatic hydrocarbons, and a concentrated aqueous solution of an alkali metal salt of a mineral acid with a concentrated mineral acid, corresponding to that contained in the alkali metal salt, separating the deposited fatty acids and removing the precipitated alkali metal salts from the aqueous solution without evaporating the same.

4. The process of recovering fatty acids and alkali metal salts of mineral acids from alkali soaps, which consists in treating a mixture of a substantially anhydrous alkali soap and an aqueous solution of an alkali metal salt of a mineral acid saturated at normal temperature with a concentrated mineral acid corresponding to that contained in the alkali metal salt separating the deposited fatty acids and removing the precipitated alkali metal salt from the aqueous solution without evaporating the same.

5. The process of recovering fatty acids and alkali metal salts of mineral acids from alkali soaps, which consists in treating a mixture of a substantially anhydrous alkali soap and an aqueous solution of an alkali metal salt of a mineral acid saturated at normal temperature with such an amount of a concentrated mineral acid sufficient for completely splitting the soaps present, separating the deposited fatty acids and removing the precipitated alkali metal salts from the aqueous solution without evaporating the same.

6. The process of recovering fatty acids and alkali metal salts of mineral acids from alkali soaps, which consists in introducing into a mixture of a substantially anhydrous alkali soap and an aqueous solution of an alkali metal salt of a mineral acid saturated at normal temperature at least one of the substances selected from the class consisting of gaseous hydrogen chloride and sulphur dioxide in an amount necessary for completely splitting the soap present, separating the deposited fatty acids and removing the precipitated alkali metal salts from the aqueous solution without evaporating the same.

MARTIN LUTHER.